Figure 2:
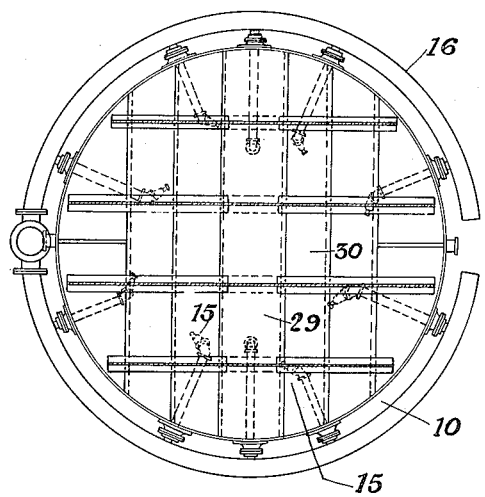

June 18, 1940.    O. R. RICE ET AL    2,204,771

GAS WASHING MEANS

Filed Sept. 25, 1937

INVENTORS
Owen R. Rice
Wilfred C. Schofield
BY
ATTORNEYS

Patented June 18, 1940

2,204,771

UNITED STATES PATENT OFFICE 2,204,771

GAS WASHING MEANS

Owen R. Rice and Wilfred C. Schofield, Chicago, Ill., assignors to Freyn Engineering Company, Chicago, Ill., a corporation of Maine Application September 25, 1937, Serial No. 165,652

5 Claims. (Cl. 261—111)

The present invention relates to improvements in gas washing means.

In the patent to Hayes, No. 2,080,713, granted May 18, 1937, there is disclosed and claimed certain gas cleaning apparatus in which a plurality of cleaning stages are embodied. According to the Hayes patent referred to, the gas is at an early stage of cleaning treated with a recirculation of hot, dirty water, make-up water being added which had been used in a later stage in the gas cleaning process. The Hayes patent discloses a tower in which the relatively clean cool water gravitates from the stage in which it operates upon relatively clean gas to the stage where the dirtier gas is being treated.

Under certain conditions difficulties have been encountered due to the collection of scale in the hot, dirty water recirculation stage. An explanation which seems plausible is as follows: The cooler water absorbs more carbon dioxide than does the hotter water used in the dirty gas cleaning stage. This water with carbon dioxide in solution therein is rather effective in dissolving certain constituents such as calcium bicarbonate which may be present in the gas being cleaned. When said relatively cool water with the calcium bicarbonate in solution reaches the hotter, dirty gas cleaning stage, the constituents, such for example as the calcium bicarbonate, referred to, are deposited out, forming a scale in the hot dirty gas cleaning stage.

An object of the present invention is to provide a simple and effective means for cleaning gas which will avoid the deposition of scale above referred to.

A further object is to provide an improved gas washing means which are simple, in which the pressure drop in the gas through the installation is minimized, and which can be used in connection with the casings of gas washing towers as now known and used.

Further objects will appear as the description proceeds.

Referring to the drawing—

Figure 1:
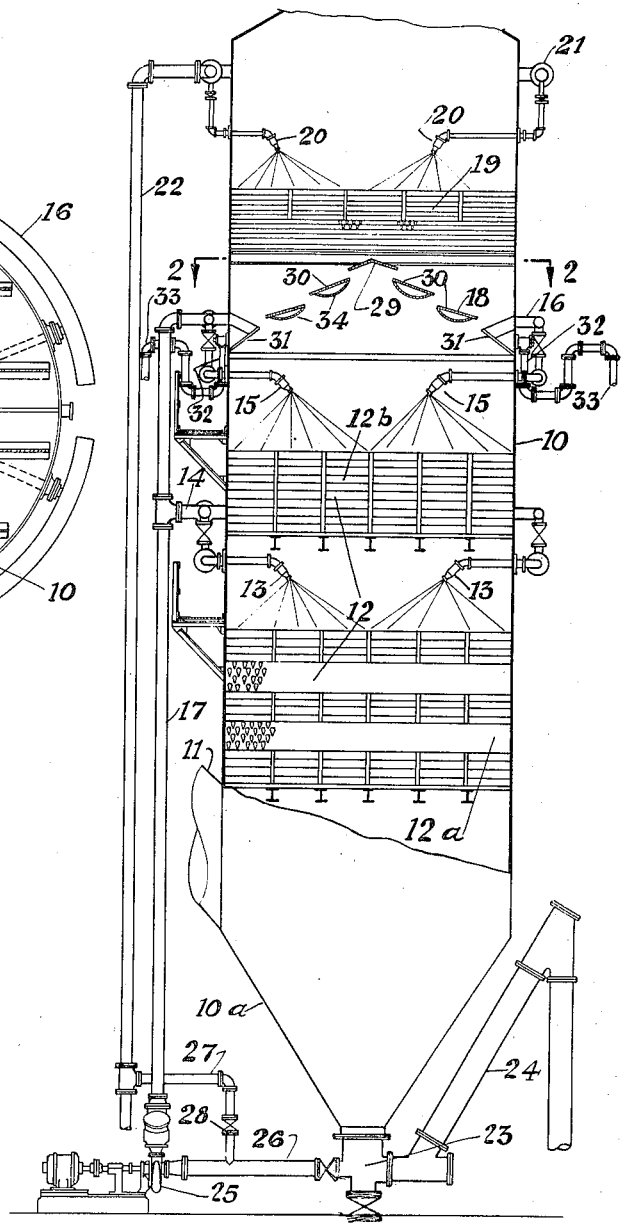

Figure 1 is a diagrammatic view illustrating an embodiment of the present invention; and Figure 2 is a diagrammatic sectional view taken along the plane indicated by the arrows 2—2 of Figure 1.

The numeral 10 indicates a tower, preferably of cylindrical form but having a cone-shaped bottom 10a. Gas is admitted to the tower 10 through the pipe 11. Said pipe 11, in blast furnace service, will as a usual proposition lead from a dust catcher (not shown). The numeral 12 indicates generally a stage of hurdles, said stage being shown as divided into a lower section 12a and an upper section 12b. Disposed above the lower section 12a are a plurality of water spray nozzles, indicated by the numerals 13—13. Said sprays are preferably disposed at spaced regions around the inside of the tower and are connected to the water supply pipe 14 which encircles the tower 10 through most of its periphery. Above the upper section 12b of the hurdles 12 are the spray nozzles 15—15 distributed at spaced regions around the inside of the tower 10. Said spray nozzles 15—15 are connected to the water pipe 16 which encircles the tower 10 through most of its periphery. Said circular water pipes 14 and 16 are supplied by the upstanding pipe 17, which, as will appear more in detail presently, leads from the bottom of the tower 10.

Located above the spray nozzles 15—15 is the water diverter 18, which will be referred to with more particularity hereinafter. Located above the water diverter 18 is the bank of hurdles 19, and above said hurdles 19 are the spray nozzles 20—20, which are also preferably disposed at spaced regions around the inside of the tower. Said spray nozzles 20—20 are connected to the pipe 21, which encircles the tower 10 through most of its periphery and is supplied by the upstanding pipe 22, which may be connected to a source of clean, relatively cool water.

For convenience in description, the stage of hurdles 12 made up of the two sections 12a and 12b, together with the spray nozzles 13 and 15, may be referred to as the hot water recirculating stage. The upper stage, including the hurdles 19 and the spray nozzles 20, may be referred to as the cooling stage. The hurdles in each of the stages referred to may take the form illustrated in the Hayes Patent No. 2,080,713 above referred to, which hurdles have a cross-sectional contour of a large inverted teardrop, the hurdles in each of the stages comprising elongated bars.

The bottom of the tower 10 is provided with the outlet assembly 23 for permitting the exit of dirty water therefrom while preventing the escape of gas therethrough. Assemblies suitable for the purpose are well known in the art and need not be described in detail. Forming part of the assembly is the pipe 24, which, through a valve (not shown), may lead to a settling device for settling out dirt from water discharged from the tower before said water is delivered to the sewer or reused. Also connected to the assembly 23 is the hot water recirculating pump 25, which delivers a portion of the water from the bottom of the tower to the hot water line 17, which connects with the circular supply pipes 14 and 16, which in turn supply the spray nozzles 13 and 15. Said pump 25 is connected to the outlet assembly 23 by means of the pipe 26. Leading from the fresh water supply pipe 22 is the pipe 27 controlled by the valve 28, which connects with the pipe 26. Make-up water may be drawn from the pipe 22 to be delivered to the pipe 26 and pump 25 for delivery to the nozzles 13 and 15 to make up for the water drawn off in service through the pipe 24.

Disposed below the stage of hurdles 19 and above the spray nozzles 15 is the water diverter 18 above referred to. The water diverter 18 has the function of intercepting water which has dropped down between the hurdles 19. The water diverter 18 may be compared to an interrupted pitched roof. In other words, said water diverter 18 is similar in a general way to a series of louvres. Said diverter 18 includes the ridge member 29 disposed diametrically with respect to the tower 10. Said ridge member 29 is illustrated as being in the form of an inverted V, the reentrant angle between the eaves thereof being obtuse. The numerals 30—30 indicate louvres disposed in parallel chords, parallel with the axis of the ridge member 29 extending across the tower 10. Each of the louvres 30 at its edge adjacent to the vertical plane marking the axis of symmetry of the ridge member 29 underlies the outer edge of the eaves of the ridge member 29 or the outer edge of the next adjacent louvre 30. In other words, the ridge member 29 and the louvres 30—30 are so arranged that water dropping either upon the ridge member 29 or upon the louvres 30—30 will be diverted transversely with respect to said ridge member 29 toward the sides of the tower 10. At the two sides of the tower 10 are located troughs 31—31 for receiving the water so diverted. The openings between the outer louvres 30—30 and the troughs 31, as well as the openings between adjacent louvres 30—30 and the openings between the eaves of the ridge member 29 and the adjacent louvres 30, provide passageways for the upward flow of gas in the tower 10. The upwardly moving gas tends to blow the downwardly flowing water toward the troughs 31—31 at the sides of the washer. Thus the water dropping down from the hurdles 19 is caused to travel in a sidewise direction both by gravity and being blown by the upwardly moving gas within the tower. Each of the troughs 31—31 is provided near its bottom with an outlet connection 32, which through a gas trap leads to a pipe 33 from which water may be conducted to the sewer.

From an inspection of Figure 1 it will be noted that each of the louvres 30 is provided with a rounded bottom 34. Said bottoms 34 are rounded throughout the widths of the corresponding louvres 30. By reason of this construction the accumulation of dirt upon said louvres from any dust remaining in the upwardly flowing gas is discouraged.

The principle of the present invention will be clear from the foregoing description. It may be explained further that the gas entering through the inlet 11 will be hot. For the purpose of illustration it may be assumed that the entering gas has a temperature of about 350 deg. F. Said gas enters tangentially and is directed circumferentially of the tower 10 around the interior of the base of the tower before passing upward through the two sections of the stage of hurdles 12. Due to the whirling motion of the gas, the largest particles of dirt are thrown by centrifugal force against the wall of the chamber, which will in practice have a stream of water flowing therealong. In this stage the gas is given a preliminary centrifugal separation and the gas is distributed to the hot water recirculating stage 12.

In passing upward through the sections 12a and 12b of the hurdle stage 12, the gas impinges on wetted surfaces. It is also more or less immersed in spray and splash, resulting in the passage of a considerable quantity of water downward through this stage of hurdles. The conditions are such as to cause turbulence, intermingling of gas and water and impingement of the gas against wetted surfaces. The stage of hurdles 12 is more or less inundated from water from the water sprays 13 and 15. This water is near boiling temperature, and by reason of this high temperature has minimum surface tension. Therefore there is the least possible resistance to the entry of dust particles into the water drops or upon the wet surfaces.

Because of the fact that the water in this stage is of approximately boiling temperature, a large amount of evaporation takes place. The heat for the evaporation is supplied by the incoming gas, that is, the sensible heat of the gas and the superheat of the water vapor content therein. In this stage the incoming gas is cooled from its incoming temperature of say 350 deg. F. to a temperature slightly above the boiling point of the water at approximately atmospheric pressure. The heat thus given up by the gas is sufficient to raise the temperature of all the water in this stage to the boiling point and to evaporate an appreciable amount of additional moisture. The gas leaving the stage of hurdles 12 may be said to be at a temperature of 220 deg. F. and to contain a very appreciable amount of moisture.

Because of the considerable quantities of dirt involved in this stage of gas cleaning it is necessary that a large amount of flushing water be used. As has been stated, the water should be at or about boiling temperature. According to the present invention a considerable proportion of the water drawn from the bottom of the tower 10 is pumped back up to the water sprays 13 and 15. Because of the continuous deposition of dirt in this recirculated water, the water, in the absence of precautions, would soon become very concentrated and the bottom of the tower would clog with dirt. To prevent such concentration, a certain proportion of the discharge from the bottom of the washer 10 (which proportion may be taken by way of example as about one-fifth) is delivered through the pipe 24 to a thickener or clarifier (not shown) before delivery to a sewer or before reuse. The make-up water is taken from the fresh water supply pipe 22, said make-up water being delivered to the pipe 26 through the pipe 27 and valve 28. The practice as at present preferred results in a concentration in the hot water recirculating stage of about 1400 grains per gallon. This concentration is not sufficient to cause difficulty in pumpage or in the spray nozzles 13 and 15, provided said spray nozzles are relatively coarse. The spray delivered by said nozzles 13 and 15 need not be very fine. Of course, the concentration of the dirty water within the hot water recirculating stage, that is, through the hurdles 12, may be chosen as desired, the degree of concentration being controllable by proportioning the flow of discharge from the tower 10 to the outlet pipe 24 and that back through the pipe 17 to the spray nozzles 13 and 15.

As indicated above, the gas which leaves the stage of hurdles 12 contains a substantial amount of moisture in evaporated form. If such gas were passed directly to the gas mains, the gas would cool down, and in doing so would pass through its dew point and would cause the deposition of water in the gas mains. This would result in so-called "sloppy" gas. Both for this reason and in order to reduce the volume of gas to reduce its velocity through the mains, it is desirable that the gas be cooled before it passes to the gas mains. For this reason the upper stage involving the hurdles 19 and the sprays 20 is provided. In this stage a certain amount of cleaning takes place by contact of the gas with water on the hurdles and in the sprays. Simultaneously the gas is cooled to approximately the temperature of the water being delivered by the spray nozzles 20. As indicated above, the cool water delivered by the spray nozzles 20 is adapted to absorb carbon dioxide from the gas flowing upwardly in the tower 10. Cold water absorbs more carbon dioxide than does hot water. This water, with the carbon dioxide dissolved therein, is adapted to dissolve certain constituents including calcium bicarbonate in the upwardly flowing gas. If this relatively cold water, containing a substantial amount of dissolved calcium bicarbonate or the like, were allowed to enter the hot water recirculating stage, its temperature would be raised and its ability to hold carbon dioxide in solution would be reduced. As a result the calcium bicarbonate would no longer be held in solution but would be precipitated, forming a scale on the hurdles 12.

By reason of the present invention the condition above mentioned is avoided. The relatively cold water which has dripped down from the hurdles 19 is diverted by the diverter 18 toward the troughs 31—31, whence said water is delivered through the pipes 33—33 to the sewer. As noted hereinabove, the gas passing upwardly through the tower 10 has the effect of blowing the water laterally, whereby said water is caused to travel toward said troughs 31—31 both by gravity and by the force of the upwardly flowing gas. The curved lower sides 31 of each of the louvres 30 serves the double purpose of stiffening said louvres and providing smooth surfaces of such shape that there is a minimum of likelihood of dirt contained in the gas to accumulate and clog the under sides of said louvres.

Though a preferred embodiment of the present invention has been described in detail, many modifications will occur to those skilled in the art. It is intended to cover all such modifications that fall within the scope of the appended claims.

What is claimed is—

1. In a cylindrical tower gas washer, in combination, a lower hot water recirculating stage and an upper cooling stage, means for supplying relatively cool water to said upper cooling stage, diverter means between said stages for permitting the upflow of gas from said hot water recirculating stage to said cooling stage while preventing the flow of water from said cooling stage down through said hot water recirculating stage, means for adding water to said recirculating stage at a region below said diverter means, and means for withdrawing water from said recirculating stage below said diverter means, said diverter including a pitched upper surface interrupted along chords whereby the upward flow of gas will aid gravity in directing downwardly flowing water toward the side of said tower.

2. In a tower gas washer, in combination, a lower hot water recirculating stage and an upper cooling stage, means for supplying relatively cool water to said upper cooling stage, and diverter means between said stages for permitting the upflow of gas from said hot water recirculating stage to said cooling stage while preventing the flow of water from said cooling stage down through said hot water recirculating stage, said diverter comprising a plurality of members having inclined upper surfaces for diverting downwardly flowing water laterally of said tower, some of said members having rounded bottoms for strengthening said members and for minimizing the collection of dust upon the bottoms of said members.

3. Cleaning apparatus comprising, in combination, a cylindrical tower, means for admitting hot dirty gas to the bottom of said tower, means for recirculating hot dirty water through the lower portion of said tower in contact with said gas, means for spraying said gas with water in the upper portion of said tower, diverter means between said portions of said tower for permitting the upflow of gas through said tower while preventing the downflow of cool water from the upper portion of said tower into the bottom portion thereof, said diverter means including interrupted pitched chordal portions for diverting water toward the side of said tower, one of said chordal portions forming a trough intersecting the cylindrical wall of said tower, and means located adjacent to the lowermost portion of said trough for drawing off said diverted water, said chordal portions having their bottoms shaped to minimize the collection of dust thereupon.

4. In a cylindrical tower gas washer, in combination, a lower hot water recirculating stage and an upper cooling stage, means for supplying relatively cool water to said upper cooling stage, and diverter means between said stages for permitting the upflow of gas from said hot water recirculating stage to said cooling stage while preventing the flow of water from said cooling stage down through said hot water recirculating stage, said diverter including interrupted chordal portions having their upper surfaces pitched toward the wall of said tower gas washer, said chordal portions being spaced vertically from one another whereby the flow of gas between said chordal portions will aid gravity in directing downwardly flowing water toward the wall of said tower gas washer, certain of said chordal portions having rounded bottoms.

5. In a cylindrical tower gas washer, in combination, a lower hot water recirculating stage and an upper cooling stage, means for supplying relatively cool water to said upper cooling stage, and diverter means between said stages for permitting the upflow of gas from said hot water recirculating stage to said cooling stage while preventing the flow of water from said cooling stage down through said hot water recirculating stage, said diverter including interrupted chordal portions having their upper surfaces pitched toward the wall of said tower gas washer, said chordal portions being spaced vertically from one another whereby the flow of gas between said chordal portions will aid gravity in directing downwardly flowing water toward the wall of said tower gas washer, some of said chordal portions having rounded bottoms for strengthening said portions and for minimizing the collection of dust upon the bottoms of said portions.

OWEN R. RICE.
WILFRED C. SCHOFIELD.